United States Patent [19]
Lagrange et al.

[11] Patent Number: 6,144,898
[45] Date of Patent: *Nov. 7, 2000

[54] CONTROL PROCESS AND DEVICE FOR TREATING THE SURFACE OF A SOLID SUBSTRATE

[75] Inventors: Gilles Lagrange, Forges les Bains; Isabelle Hibon, Le Chesnay, both of France

[73] Assignee: L'Air Liquide Societe Anonyme pour l'Etude et l'Exploitation des Procedes Georges Claude, Paris, France

[*] Notice: This patent is subject to a terminal disclaimer.

[21] Appl. No.: 08/882,328

[22] Filed: Jun. 25, 1997

[30] Foreign Application Priority Data

Jul. 23, 1996 [FR] France ................................. 96 09233

[51] Int. Cl.$^7$ .................................................. G05D 13/00
[52] U.S. Cl. ......................... 700/304; 700/160; 700/122; 700/207; 700/204; 700/205; 700/222; 700/492; 700/287; 700/433; 700/434; 700/435; 700/439; 205/918
[58] Field of Search ........................ 364/528.39; 34/492, 34/287, 433, 402, 404, 432, 434, 435, 439, 443; 205/918; 700/304, 160, 122, 207, 95, 148, 150, 180, 175, 192, 204, 205, 222

[56] References Cited

U.S. PATENT DOCUMENTS

| | | | |
|---|---|---|---|
| 4,297,187 | 10/1981 | Deguchi et al. | 204/164 |
| 4,946,568 | 8/1990 | Kalwar et al. | 204/164 |
| 5,527,629 | 6/1996 | Gastiger et al. | 428/688 |

(List continued on next page.)

FOREIGN PATENT DOCUMENTS

| | | |
|---|---|---|
| 010632 | 5/1980 | European Pat. Off. . |
| 129199 | 12/1984 | European Pat. Off. . |
| 248274 | 12/1987 | European Pat. Off. . |
| WO 92/11312 | 9/1992 | European Pat. Off. . |
| 658416 | 6/1995 | European Pat. Off. . |

OTHER PUBLICATIONS

Yumoto et al., (Surface Processing of PTFE by Electrical Discharge . . . ), IEEE, pp. 389–392, 1992.

Haidara et al., (Electron Multiplication in Liquid . . . ), IEEE, pp. 592–597, Aug. 1991.

Lehtio et al., (Recognition of Electrical Discharges . . . ), IEEE, pp. 370–375, Oct. 1992.

Hsiao et al., (Pulse Corona and Dielectric–Barrier Discharge . . . ), IEEE, pp. 270, 5–Aug. 6, 1995.

(List continued on next page.)

*Primary Examiner*—William Grant
*Assistant Examiner*—McDieunel Marc
*Attorney, Agent, or Firm*—Burns, Doane, Swecker & Mathis, LLP

[57] ABSTRACT

A control device for operation of a system for treating a surface of a solid running substrate by dielectric-barrier electrical discharge in a controlled gaseous atmosphere, comprising (A) a system which includes (i) a treatment device through which a substrate to be treated runs at a speed, (ii) the system is connected to the treatment device for supplying the treatment device with a flow of gas, (iii) the system is connected to the treatment device for supplying the treatment device with electrical power in order to produce the electrical discharge and (iv) the system sucking out the gas, (B) a data processing unit capable of receiving, as input, a datum regarding the speed at which the substrate is running through the treatment device, the data processing unit further comprising an output side connected to the system for controlling the electrical power supply system, in order to regulate the flow of gas delivered by the or each of the gas supply system and/or the electrical power delivered by the electrical power supply system to the device as a function of the speed at which the substrate is running through the treatment device, so as to obtain a surface treatment of the substrate with an equivalent quality whatever the speed at which the substrate is running through the treatment.

15 Claims, 1 Drawing Sheet

U.S. PATENT DOCUMENTS

| | | | |
|---|---|---|---|
| 5,685,955 | 11/1997 | Leigraf et al. | 700/122 |
| 5,711,147 | 1/1998 | Vogtlin et al. | 423/213.7 |
| 5,763,892 | 6/1998 | Kizaki et al. | 250/492.1 |
| 5,891,409 | 4/1999 | Hsiao et al. | 423/239.1 |
| 5,953,230 | 9/1999 | Moore | 700/122 |
| 6,016,751 | 1/2000 | Hess | 700/122 |

OTHER PUBLICATIONS

Sugita et al., "Vacuum Deposition of Co=Cr Perpendicular Anisotropy Films on Polymer Substrates Treated with Ion Beam", IEEE, pp. 4183–4185, vol. 25, May 1989.

Patent Abstracts of Japan, publication No. 60228673, published Nov. 13, 1985.

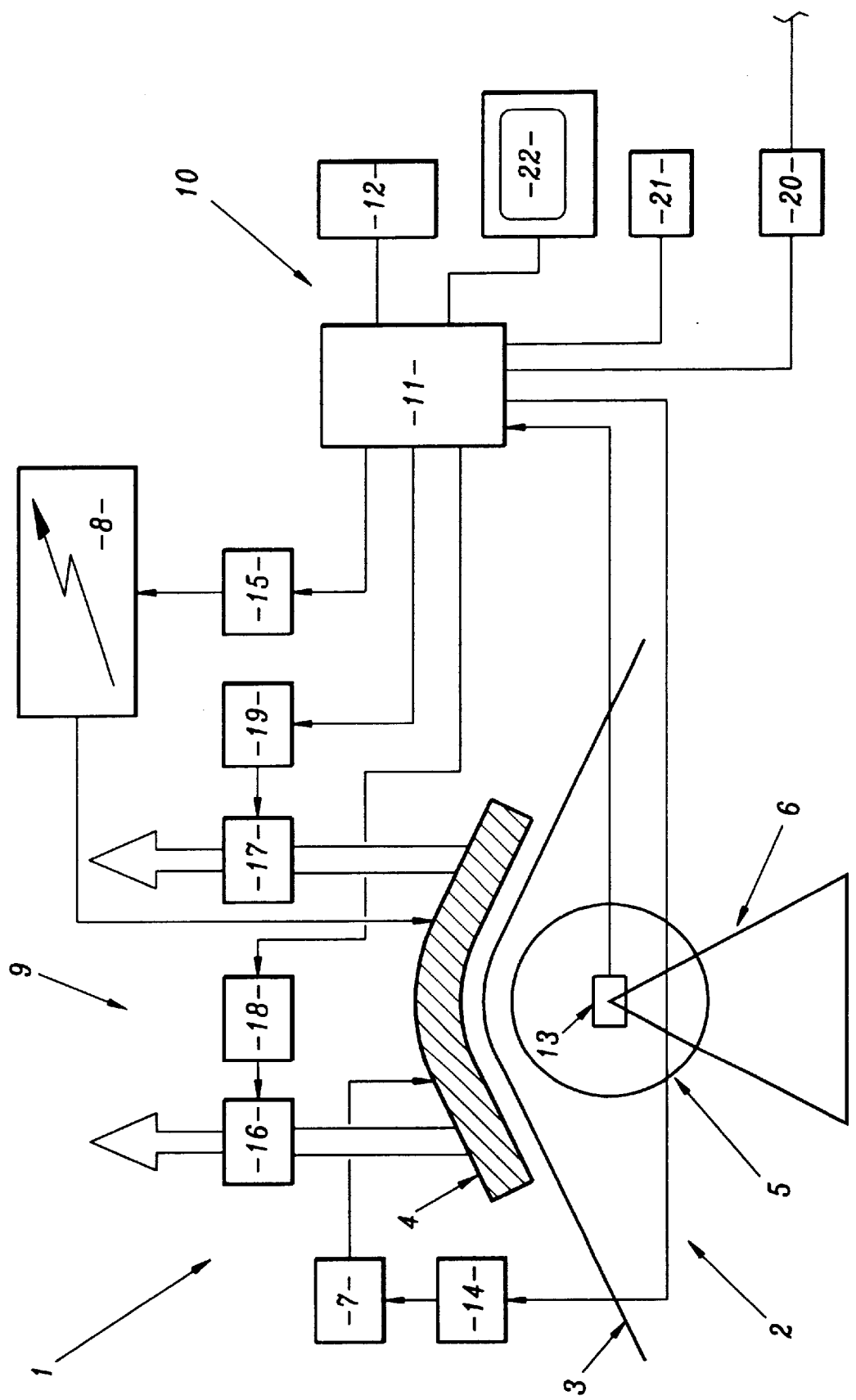

CONTROL PROCESS AND DEVICE FOR TREATING THE SURFACE OF A SOLID SUBSTRATE

BACKGROUND OF THE INVENTION (i) Field of the Invention

The present invention relates to a control device for the operation of a system for treating the surface of a solid running substrate by dielectric-barrier electrical discharge in a controlled gaseous atmosphere.

By way of illustration, the following application examples may be mentioned: the treatment of polymer films for food packaging or the manufacture of capacitors.

(ii) Description of Related Art

Already known in the prior art, for example the document in the name of E. Prinz which appeared in "Plastics Southern Africa" in June 1983, pages 50 et seq., are surface treatment systems of this type which include a treatment device through which the substrate to be treated runs, this device being connected to means for supplying the treatment device with gas, to means for supplying the latter with electrical power in order to produce the electrical discharge and to gas suction means.

Such systems enable substrates to be treated in order to improve their properties, especially those of adhesion, of wettability and of gas or liquid impermeability, thereby enabling their fields of application to be extended.

Thus it has already been proposed, by the document EP-516,804 in the name of the Applicant, to deposit a thin layer of silicon oxide bonded to a substrate made of a polymer material, which comprises subjecting one surface of the substrate to a dielectric-barrier electrical discharge and exposing this surface to an atmosphere containing a silane, by virtue of which a deposition of silicon oxide, bonded to the surface of the substrate, is formed.

The treatment devices for implementing this type of process are generally integrated into a line for the continuous production or conversion of such substrates (for the purpose, for example, of printing, laminating or metallizing them) and these devices are regulated using a pre-established recipe depending especially on the characteristics of the conversion/production into which they are integrated.

However, it will be appreciated that this has a number of drawbacks, especially with regard to the reproducibility of the quality of the substrate resulting from the treatment since it is extremely difficult permanently to adapt the operating parameters of these treatment devices to the operating conditions of such a conversion or production line.

SUMMARY AND OBJECTS OF THE INVENTION

The object of the invention is therefore to solve these problems.

For this purpose, the subject of the invention is a control device for the operation of a system for treating the surface of a solid running substrate by dielectric-barrier electrical discharge in a controlled gaseous atmosphere, the system being of the type which includes a treatment device through which a substrate to be treated runs, this device being connected to means for supplying the treatment device with gas, to means for supplying the latter with electrical power in order to produce the electrical discharge and to gas suction means, the control device being characterized in that it includes a data processing unit which receives, as input, a datum regarding the speed at which the substrate is running through the treatment device, the data processing unit being connected, on the output side, to means for controlling the gas supply means and to means for controlling the electrical power supply means, in order to regulate the flow of gas delivered by the or each of the gas supply means and/or the electrical power delivered by the electrical power supply means to the device, as a function of the speed at which the substrate is running through the treatment device, so as to obtain a surface treatment of the substrate with an equivalent quality whatever the speed at which the latter is running through the treatment device.

As will be clearly apparent to those skilled in the art, the notion of "quality" of the treatment obtained according to the invention varies from one product to another and from one industrial site to another, for example depending on the applications (inking, metallization, etc.) or as a function of the specifications required by each site.

By way of illustration, but with no limitation implied, mention will be made here of the following examples of measurements, made on such or such an industrial site, for evaluating the quality and acceptability of the components treated:

- measurements of the surface tension of treated polymer films;
- measurements of the spread (wetting angle) of a drop of water on the treated surface;
- evaluation, in terms of surface tension, of inks which have been calibrated beforehand by the industrial body;
- ink adhesion tests using the sticky-tape method in which the tensile force before disbondment is measured (a test well known to metallurgists);
- corrosion tests such as that performed by applying an electrical voltage to the metallization and observing the variation in this metallization over time (ageing).

It will be therefore understood that the notion of "equivalent" quality according to the invention should be interpreted, depending on the circumstances for example, as being dependent on the result of the test or tests commonly performed by each user site, and therefore on the result of the test performed and defined as being acceptable by the user site in question. By way of illustration, mention may thus be made of a tensile force at rupture in the sticky-tape test or, by way of a second example, a wetting angle of a drop of water on the treated support.

Advantageously, the data processing unit is connected, on the output side, to means for controlling the suction rate of the suction means.

The invention will be more clearly understood on reading the description which follows, given solely by way of example and with reference to the appended drawing.

BRIEF DESCRIPTION OF THE DRAWING

The FIGURE shows a schematic diagram illustrating the structure and the operation of a control device according to the invention.

DETAILED DESCRIPTION OF PREFERRED EMBODIMENTS

Recognizable in this FIGURE is, in fact, a control device for the operation of a system for the surface treatment of a solid running substrate by dielectric-barrier electrical discharge in a controlled gaseous atmosphere.

In this FIGURE, the system is denoted by the general reference 1 and includes, in a general way, a treatment device of appropriate type, denoted by the general reference 2, through which the substrate to be treated runs, this substrate being denoted by the general reference 3 in this FIGURE.

This substrate is, for example, in the form of a sheet of film to be treated which runs between a stationary part 4 of the treatment device 2 and a rotating part 5 thereof, this device also including support means denoted by the general reference 6 (it will be understood that the part 4 is stationary during the treatment phase, the system usually being mounted on jacks enabling it to be raised and lowered during other phases).

This treatment device, and more particularly the stationary part 4 thereof, is connected to means for supplying the treatment device with gas, these being denoted by the general reference 7 in this FIGURE, to means for supplying the latter with electrical energy, denoted by the general reference 8 in this FIGURE, in order to produce the electrical discharge in the device and to gas suction means denoted in a general way by the reference 9 in this FIGURE.

The various means which have just been described may have any appropriate structure, for example one known in the prior art, so that they will not be described in more detail below.

According to the invention, the control device also includes a data processing unit, denoted by the general reference 10 in this FIGURE, which includes, for example, any appropriate computer 11 associated with storage means 12, this data processing unit 10 receiving, as input, a datum regarding the speed at which the substrate 3 is running through the treatment device 2, this datum being supplied, for example, by a rotation speed sensor 13 associated with the rotating part 5 of the treatment device.

On the output side, this data processing unit 10 is connected to means 14 for controlling the gas supply means 7 and to means 15 for controlling the electrical power supply means 8 in order to regulate the flow of gas delivered by the or each of the gas supply means, for example if the latter include several gas sources, and/or the electrical power delivered by the electrical power supply means to the device, as a function of the speed at which the substrate is running through the treatment device, so as to obtain a surface treatment of the substrate with an equivalent quality whatever the speed at which the latter is running through the treatment device.

Moreover, and as shown, the gas suction means denoted by the general reference 9 may include at least first suction means 16 placed on the input side of the treatment device and second suction means 17 placed on the output side of the treatment device (it should be understood that input and output of the treatment device are defined with respect to the direction in which the objects to be treated are running through the device), the data processing unit 10 then being connected respectively to means 18 and 19 for controlling the suction rates of the first and second suction means 16, 17 respectively, as a function of the rate at which gas is supplied to the device by the corresponding supply means 7.

It will also be noted that the controlled gaseous atmosphere in the treatment device may contain any gas whether of inert, oxidizing or reducing nature, as is described in the aforementioned prior document (EP-516,804).

Various teachings relating to this composition and the deposition process may be found in this document.

It will therefore be appreciated that the data processing unit integrated into the control device according to the invention makes it possible to regulate, firstly, the flow of gas supplied to the device, secondly, the electrical power applied to the latter and, finally, the gas suction rate, in order to adapt these operating parameters of the device and to regulate them as a function of the speed at which the substrate is running through the device, thereby maintaining an equivalent quality of treatment of the substrate while it is passing through this device.

This therefore enables the operating conditions of the treatment device to be adapted to the operating conditions of the conversion or production line in which such a device is integrated in order to maintain the productability of the treatment.

These various parameters for controlling the operation of the treatment device are regulated conventionally, for example using programs and data stored in the processing unit 10.

The various necessary items of information are firstly established by analysing the operation of the device, for example under various conditions, thereby enabling the various relationships linking the various parameters for controlling the operation of this device to be established, these relationships then being used to regulate the operation of the latter.

It will also be noted that the data processing unit 10 may be connected to a center for the remote control/monitoring of the treatment system via data transmission means, denoted by the general reference 20 in this FIGURE.

These data transmission means may also have any appropriate structure enabling them to exchange data between this unit and the remote control/monitoring center.

Finally, the data processing unit may also be associated with a man/machine interface which includes means 21 for inputting data, for example by an operator, and data display means 22.

This data processing unit 10 may also include means for simulating and/or modelling the operation of the treatment device 2, making it possible, on the basis of (established) input parameters of the device, to determine an estimated treatment of the substrate 3 on the output side of the device or alternatively, on the basis of a desired treatment of the substrate 3 on the output side of the device 2, to determine estimated input parameters thereof.

These various means may, for example, consist of programs which are incorporated into the treatment unit and are established, for example experimentally, in order to provide the desired simulation and/or modelling.

The input parameters for such simulation and/or modelling means may therefore include a number of elements among which mention may be made of:

the type of substrate to be treated,
the rate at which the latter is running through the treatment device,
the electrical power delivered by the power supply means to the treatment device,
the composition of the gaseous atmosphere,
the gas supply rate,
the gas suction rate,
the nature or the geometry of the electrodes producing the electrical discharge, or
the characteristics of the electrical signal producing the discharge (frequency, amplitude, shape of the signal, etc).

Of course, various embodiments of the various means which have just been described may be envisaged.

In a general way, the actual structure of these means may be conventional, the operation of the latter by the data processing unit 10 being regulated by controlling these means, for example in terms of voltage, current or another quantity.

What is claimed is:

1. A control device for operation of a system for treating a surface of a solid running substrate by dielectric-barrier electrical discharge in a controlled gaseous atmosphere, comprising
   (A) a system which includes (i) a treatment device through which a substrate to be treated runs at a speed, (ii) means connected to said treatment device for supplying the treatment device with a flow of gas, (iii) means connected to said treatment device for supplying the treatment device with electrical power in order to produce the electrical discharge and (iv) gas suction means,
   (B) a data processing unit capable of receiving, as input, a datum regarding the speed at which the substrate is running through the treatment device while being treated, the data processing unit further comprising an output side connected to a means for controlling the gas supply means and to means for controlling the electrical power supply means, in order to regulate the flow of gas delivered by the or each of the gas supply means and/or the electrical power delivered by the electrical power supply means to the device as a function of the speed at which the substrate is running through the treatment device while being treated, so as to obtain a surface treatment of the substrate with an equivalent quality whatever the speed at which the substrate is running through the treatment device.

2. The control device according to claim 1, wherein the data processing unit is connected, on the output side, to a means for controlling suction rate of the gas suction means.

3. The control device according to claim 2, wherein the data processing unit regulates the suction rate of the suction means as a function of gas supply rate of the gas supply means.

4. The control device according to claim 2, wherein the suction means include at least first suction means placed on an input side of the treatment device and second suction means placed on an output side of the treatment device and wherein the data processing unit is connected, on the output side, to means for controlling suction rates of the first and second suction means.

5. The control device according to claim 1, wherein the data processing unit furthermore includes means for simulating and/or modelling operation of the treatment device making it possible, on the basis of established input parameters of the treatment device, to determine an estimated treatment of the substrate on an output side of the device or, on the basis of a desired treatment of the substrate on the output side of the device, to determine estimated input parameters thereof.

6. The control device according to claim 1, wherein the data processing unit is connected to a center for remote control/monitoring of the treatment system via a means for data transmission means.

7. The control device according to claim 1, wherein the data processing unit is connected to at least one man/machine interface.

8. The control device according to claim 1, wherein the datum regarding the speed at which the substrate is running through the treatment device is delivered to the data processing unit by a speed sensor associated with the treatment device or to a line for production or conversion of substrates, into which line the device is integrated.

9. A process for controlling operation of a system for treating a surface of a solid running substrate by dielectric-barrier electrical discharge in a gaseous atmosphere, the system comprising a treatment device through which the substrate to be treated runs at a speed while being treated, this device being connected to a means for supplying the treatment device with a flow of gas, to a means for supplying the treatment device with electrical power in order to produce the electrical discharge and to a means for suction of gas, comprising the steps of:
   measuring the speed at which the substrate is running through the treatment device;
   controlling the gas supply means and the electrical power supply means in order to regulate the flow of gas delivered by the or each of the gas supply means and/or the electrical power delivered by the electrical power supply means to the device, as a function of the speed at which the substrate is running through the treatment device while being treated, so as to obtain a surface treatment of the substrate with an equivalent quality whatever the speed at which the substrate is running through the treatment device.

10. The control process according to claim 9, further comprising the step of controlling the suction rate of the suction means.

11. The control process according to claim 10, wherein the suction rate of the suction means is regulated as a function of the gas supply rate of the gas supply means of the device.

12. The control process according to claim 11, wherein the suction means include at least first suction means placed on an input side of the treatment device and second suction means placed on an output side of the treatment device and wherein the suction rates of the first and second suction means are regulated.

13. The control process according to claim 9, further comprising the steps of carrying out operations for simulating and/or modelling operation of the treatment device and determining, on the basis of established input parameters of the device, an estimated treatment of the substrate on an output side of the device or, on the basis of a desired treatment of the substrate on an output side of the device, determining estimated input parameters thereof.

14. The control process according to claim 13, wherein the input parameters for the simulation/modelling operation comprise one or more of the elements of the following list:
   type of substrate to be treated,
   speed at which the substrate is running through the treatment device,
   power delivered by the power supply means to the treatment device,
   composition of the gaseous atmosphere, and
   gas supply rate.

15. The control process according to claim 9, wherein the treatment system is remotely controlled via a means for transmission of data.

* * * * *